C. M. CHASE.
HOSE-COUPLING.

No. 185,494. Patented Dec. 19, 1876.

WITNESSES
Frank G. Parker
E. A. Stock

INVENTOR
Chs. M. Chase.
by J. H. Adams
Atty.

UNITED STATES PATENT OFFICE.

CHARLES M. CHASE, OF BOSTON, ASSIGNOR TO HIMSELF AND ARTHUR C. GOULD, OF BROOKLINE, MASSACHUSETTS.

IMPROVEMENT IN HOSE-COUPLINGS.

Specification forming part of Letters Patent No. 185,494, dated December 19, 1876; application filed October 12, 1876.

*To all whom it may concern:*

Be it known that I, CHARLES M. CHASE, of Boston, in the county of Suffolk and State of Massachusetts, have invented a Hose-Coupling, of which the following is a specification:

The object of my invention is to produce a simple and efficient device for coupling hose; and the invention consists in providing each half of a coupling with two projecting catches and two slots or openings, into which the said catches are inserted, and engage with an inclined lip or edge, so that by turning the couplings the two portions will be securely held together. The catches and slots are so arranged that any two halves of coupling will fit each other, so that any two parts of a hose can be readily connected to each other and firmly secured.

Figures 1, 2, 5:
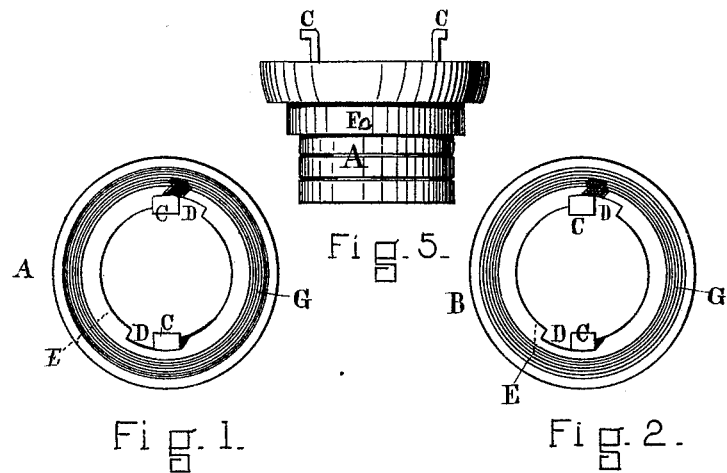
Figure 4:
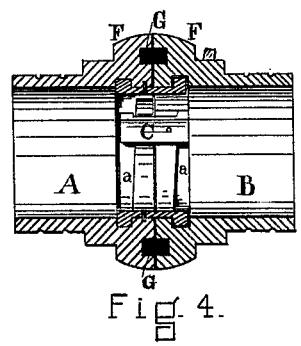
Figure 3:
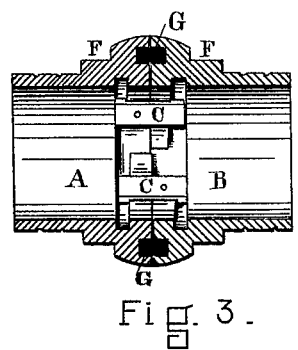

In the drawings, Figures 1 and 2 represent a plan view of the outer face of each coupling. Figs. 3 and 4 are longitudinal sections of the same, and Fig. 5 is an elevation of each half of the coupling.

To the meeting ends of each half of the coupling A B are attached two bars, C C, projecting from the inner surface, and bent outward at a right angle at the ends, as shown in Fig. 5, so as to form a catch. These bars are placed directly opposite each other. In the inner edges of each half of the coupling are slots or openings D D, placed opposite each other. The inner edge E forms a rim, the thickness of which at the opening or slot D is about equal to the length of the bar C below the angular projection, and increases in width, so as to form an incline on the under side, as shown at a a, Fig. 4. The two faces of the coupling are provided each with a packing, G, of any suitable material.

The advantages that this device has over former ones are simplicity of construction and protection of the coupling. Hose-couplings are subjected to very rough usage, being dragged over rough ground and stones; and as other similar devices for coupling are all outside, the grooves would be filled with dirt, and be difficult to connect. This coupling is entirely protected, as the devices are all inside.

The operation of attaching and detaching the coupling is very simple, and can be performed in an instant. It is done by simply inserting the projections or bars C C in the openings D D. The projections C C catch on the inclines a a, and by giving a slight turn to one part of the coupling the two parts are firmly secured to each other.

As both parts of the coupling are made precisely alike, any two can be readily attached to each other without loss of time. In ordinary couplings use is made of a male and female screw, or equivalent devices, which require a nice fitting of the parts, occasioning difficulty and loss of time in connecting together.

What I claim as my invention, and desire to secure by Letters Patent, is—

In combination with the two parts A B of a hose-coupling, the projecting bars or catches C C and the inclined recesses a a, arranged on the inner side of the coupling, substantially as and for the purpose set forth.

In testimony whereof I have signed my name to this specification in the presence of two subscribing witnesses.

C. M. CHASE.

Witnesses:
J. H. ADAMS,
ARTHUR C. GOULD.